US005554227A

United States Patent [19]

Kwok et al.

[11] Patent Number: 5,554,227

[45] Date of Patent: Sep. 10, 1996

[54] PROCESS OF MANUFACTURING CRYSTAL SUGAR FROM AN AQUEOUS SUGAR JUICE SUCH AS CANE JUICE OR SUGAR BEET JUICE

[75] Inventors: Robert J. Kwok, Puunene, Hi.; Xavier Lancrenon, Chicago, Ill.; Marc-Andre Theoleyre, Paris, France

[73] Assignee: Societe Nouvelle de Recherches et d'Applications Industrielles d'Echangeurs d'Ions Applexion, Epone, France

[21] Appl. No.: 151,383

[22] Filed: Nov. 12, 1993

[51] Int. Cl.$^6$ .............................. C13F 1/02; C13F 1/28; C13J 1/06; B01D 15/08

[52] U.S. Cl. ............................ 127/58; 127/46.2; 127/55; 127/63; 210/656; 210/660; 210/687

[58] Field of Search .............................. 127/58, 55, 46.2, 127/63; 210/656, 660, 687

[56] References Cited

U.S. PATENT DOCUMENTS 2,413,844 1/1947 Rawlings .............................. 127/46.2

5,176,832 1/1993 Dorta et al. ........................... 127/46.3

*Primary Examiner*—Asok Pal

*Assistant Examiner*—Patricia L. Hailey

*Attorney, Agent, or Firm*—Lane, Aitken & McCann

[57] ABSTRACT

This invention relates to a process for the manufacture of crystal sugar from an aqueous sugar juice containing sugars and organic and mineral impurities, including $Ca^{2+}$ and/or $Mg^{2+}$ ions, such as a sugar cane or sugar beet juice, comprising the following operations:

(a) concentration of said sugar juice to give a syrup, and (b) crystallization of said syrup to give a crystal sugar and a molasses, characterized in that it also comprises an operation:

(c) of tangential microfiltration, tangential ultrafiltration or tangential nanofiltration, this operation being effected before operation (a).

It also relates to a process for the production of crystal white sugar from a sugar juice of the sugar cane juice type, comprising the above-mentioned process for the production of crystal sugar, completed by re-melt, decolorization and crystallization operations.

8 Claims, 2 Drawing Sheets

Figure 1:
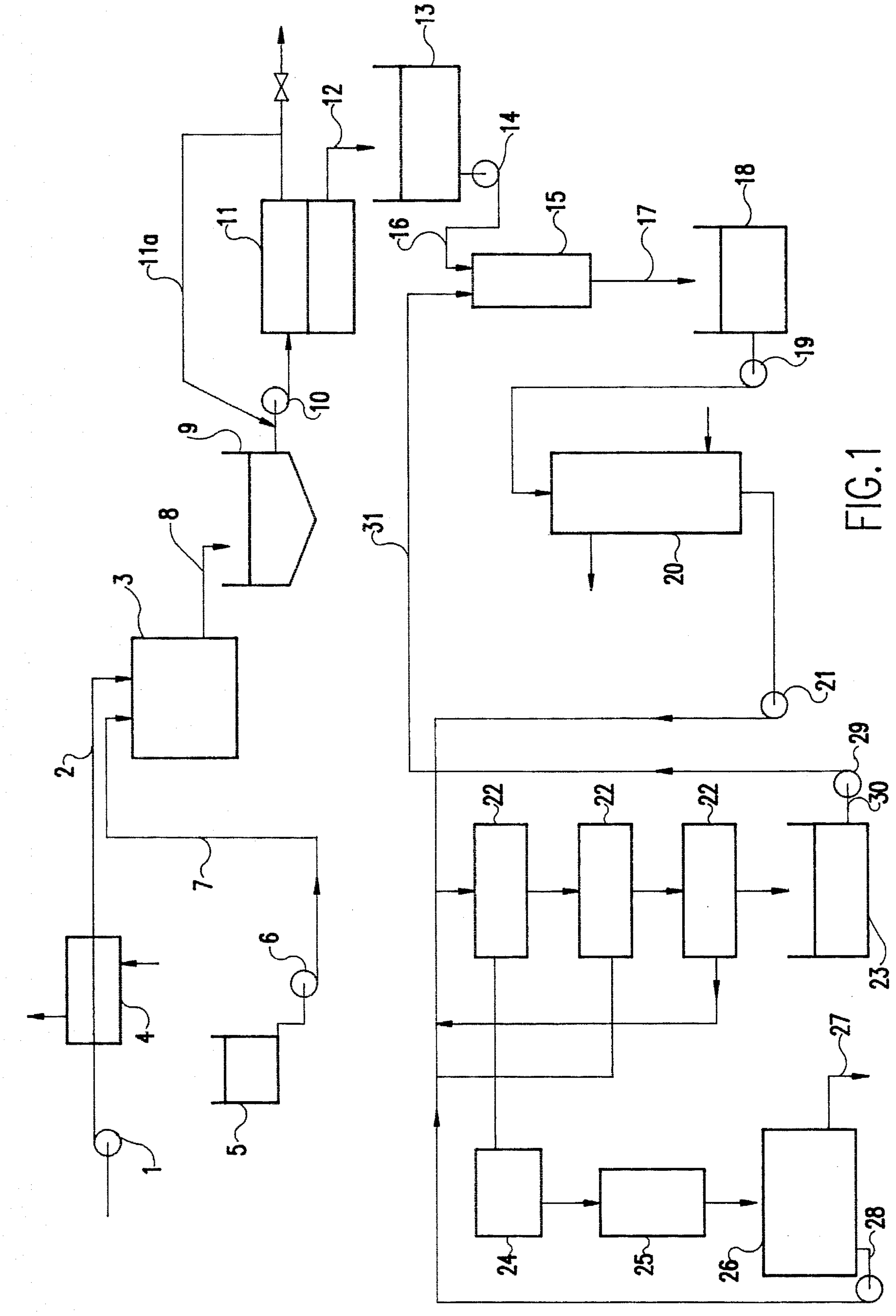

PROCESS OF MANUFACTURING CRYSTAL SUGAR FROM AN AQUEOUS SUGAR JUICE SUCH AS CANE JUICE OR SUGAR BEET JUICE

This invention relates to a process for the manufacture of crystal sugar from an aqueous sugar juice containing sugars and organic and mineral impurities, including $Ca^{2+}$/or $Mg^{2+}$ ions, such as a sugar cane or sugar beet juice, comprising the following operations:

(a) concentration of said sugar juice to give a syrup, and (b) crystallization of said syrup to give a crystal sugar and a molasses.

Processes of the above type are already known for the manufacture of raw sugar, inter alia from sugar cane juice. These processes have a number of disadvantages, the major ones of which are as follows:

i) the raw sugar obtained has a relatively high degree of coloring (of the order of 800–4000 ICUMSA units depending on the manufacturing processes). Numerous studies have proved that the coloring of the crystal sugars depends largely on the content of colloidal substances present in the sugar juices; these colloidal substances could form coloring precursors during the crystallization operation (b);

ii) scaling of the concentration equipment and boiling appliances by the Ca and/or Mg salts present in the initial sugar juice, such scaling limiting the energy yield of said equipment and appliances; also, the $Ca^{2+}$ and $Mg^{2+}$ ions result in turbidity of the crystal sugars.

iii) low sugar extraction yield of the massecuite (material subjected to crystallization) because of the presence of organic impurities such as colloidal substances and mineral impurities such as $Ca^{2+}$ and/or $Mg^{2+}$ ions and other non-sugars within the massecuite, resulting in crystallization being retarded, the yield of the first crystallization crop generally not exceeding 40 to 56%, thus necessitating a high volume of crystallization syrup being recycled and increasing the energy consumption.

Processes of the above type are also known for the manufacture of crystal white sugar, inter alia from sugar beet juice. Apart from the fact that these processes have the above disadvantages ii) and iii), they require complex purification operations, namely pre-liming operations (addition of lime at the rate of 2 to 3 g/l of sugar juice), liming (addition of lime at the rate of 10 to 15 g/l of sugar juice), carbonation (injection of $CO_2$ to a pH of about 11), filtration, recarbonation (injection of $CO_2$ to a pH of about 9) and final filtration. These various purification operations necessitate considerable investment, which has an adverse effect on the cost price of the crystallized sugar. The object of this invention is to obviate the above disadvantages of the prior art processes and, to this end, it proposes a process for the manufacture of crystal sugar, as defined in the first paragraph of this description, which is characterized in that it also comprises a tangential microfiltration, tangential ultrafiltration or tangential nanofiltration operation (c), this operation being effected before operation (a).

By using this operation (c), it is possible to eliminate the colloidal substances present in the clarified sugar juice and, to the extent that such substances are precursors of dyes which develop during crystallization, thus produce at the end of the process a crystal sugar of reduced coloration. This is particularly true in the case in which the initial aqueous sugar juice is a juice of the sugar cane juice type, since the process according to the invention then enables a raw sugar to be obtained with a coloring less than 400 ICUMSA units, while the conventional processes result in a raw sugar having a coloring of 800 to 4000 ICUMSA units.

By using the techniques of tangential microfiltration, ultrafiltration or nanofiltration it is possible substantially to reduce the turbidity of the clarified juice. It should be noted that the quantity of colloids present in a liquid is estimated by its turbidity (expressed in NTU/Brix) that they generate within the liquid. Thus, by way of example, it will be noted that the tangential ultrafiltration of a clarified cane sugar juice enables the turbidity of this juice to be reduced from about 15 to 60 NTU/Brix to a value as low as 0.1 to 0.2 NTU/Brix.

Also, according to another feature, the process according to the invention also comprises: (d) a softening operation, this operation being effected before operation (a) and on the sugar juice which has undergone the tangential microfiltration, ultrafiltration or nanofiltration operation (c).

By eliminating the colloidal substances as a result of the microfiltration, ultrafiltration or nanofiltration operation, and eliminating the $Ca^{2+}$ and/or $Mg^{2+}$ ions as a result of the softening operation, not only is scaling of the evaporation and crystallization equipment greatly limited with an increase in their energy yields, but in addition the crystallization operations are accelerated and the quantities of recycled massecuite are reduced (generally by about 20%), thus giving a substantial energy saving (up to about 15%) and an increased sugar extraction yield, the yield of the first crystallization crop being as much as 65%.

The softening operation (d) will advantageously be effected by bringing the sugar juice which has undergone the tangential microfiltration, ultrafiltration or nanofiltration operation (c) into contact with a cation exchange resin, and inter alia a strong cationic resin, preferably in the $Na^+$ and/or $K^+$ form.

According to yet another feature of the invention, the crystallization operation (b) may be followed by an operation (e) comprising chromatography of said molasses to give a first sugar-depleted liquid effluent and a second sugar-enriched liquid effluent; an operation (e) of this kind is perfectly integrated into the process according to the invention since the prior tangential microfiltration, ultrafiltration or nanofiltration operation (c) and softening operation (d) allow a substantial elimination respectively of the colloidal substances and $Ca^{2+}$ and/or $Mg^{2+}$ ions usually responsible for the relatively rapid reduction of the chromatography separation power.

The process according to the invention may also comprise an operation (f) for regeneration of the cation exchange resin used in operation (d), by bringing said resin into contact with the molasses produced by the crystallization operation (b) or with the first sugar-depleted liquid effluent produced by the chromatography operation (e). It will be noted that this regeneration operation makes clever use of one of the effluents produced during the process, so that there is no supply of external regenerating reagent and, hence, there is a saving as compared with the prior-art regeneration systems.

It should be finally noted that the tangential microfiltration, ultrafiltration or nanofiltration operation (c) not only enables the colloidal substances present in the initial sugar juice to be eliminated, but also enables the juice to be clarified, i.e. the suspended substances to be eliminated. However, in order to obviate excessively rapid clogging of the membrane used in the tangential filtration operation, it is preferable to provide a prior clarification operation (g) on the initial aqueous sugar juice before subjecting it to operation (c), said operation (g) preferably comprising a flocculation step followed by a decantation step.

From a study of the foregoing it will be apparent that the use of the process according to the invention results in a substantial improvement in the overall sugar refinery balance-sheet with, additionally in the case in which the initial sugar juice is of the cane sugar juice type, a gain in raw sugar purity, which passes from 98–99.4% (in the conventional process) to 99.7%. This improvement is obtained by the use of a tangential microfiltration, ultrafiltration or nanofiltration operation and a softening operation, techniques which are well known, simple, flexible, of high efficiency, fast, well-controlled and of low utilization cost. Also, when the initial sugar juice is of the sugar-beet juice type, the use of the tangential microfiltration, ultrafiltration and nanofiltration operation (c), possibly in combination with the simple clarification operation (g), advantageously enables the above-mentioned complex and tedious purification operations to be dispensed with.

The invention also covers a process for the manufacture of white crystal sugar from an aqueous sugar juice of the sugar cane juice type, containing sugars and organic and mineral impurities, including $Ca^{2+}$ and/or $Mg^{2+}$ ions. This process is characterized in that it comprises the above-described crystal sugar production process resulting in the production of a raw sugar, followed by refining this raw sugar, refining comprising the following operations:

(h) re-melting of the raw sugar to give a melt sugar, (i) decolorization of the melt sugar to give a decolorized melt sugar and (j) crystallization of the decolorized melt sugar to give crystal white sugar, the latter possibly having a purity as high as 99.9% and a coloring as low as 30 ICUMSA units.

It should be noted that compared with the conventional technique for refining raw sugar, the refining used in the process according to the invention for the production of crystal white sugar dispenses with the affination, purification (carbonation or phosphatation) and filtration operations by the use of operations (a) to (d) and possibly (e) and (f) described above, resulting in the production of a purer raw sugar which is less highly colored and no longer contains colloidal substances, compared with the sugar obtained by conventional techniques. The elimination of the affination, carbonation or phosphatation and filtration operations is of obvious advantage in view of the delicate and complex character of the crystallization operations on the affination syrup and low-grade sugar syrup. The advantage of the process according to the invention for the production of crystal white sugar is therefore obvious financially.

Figure 2:
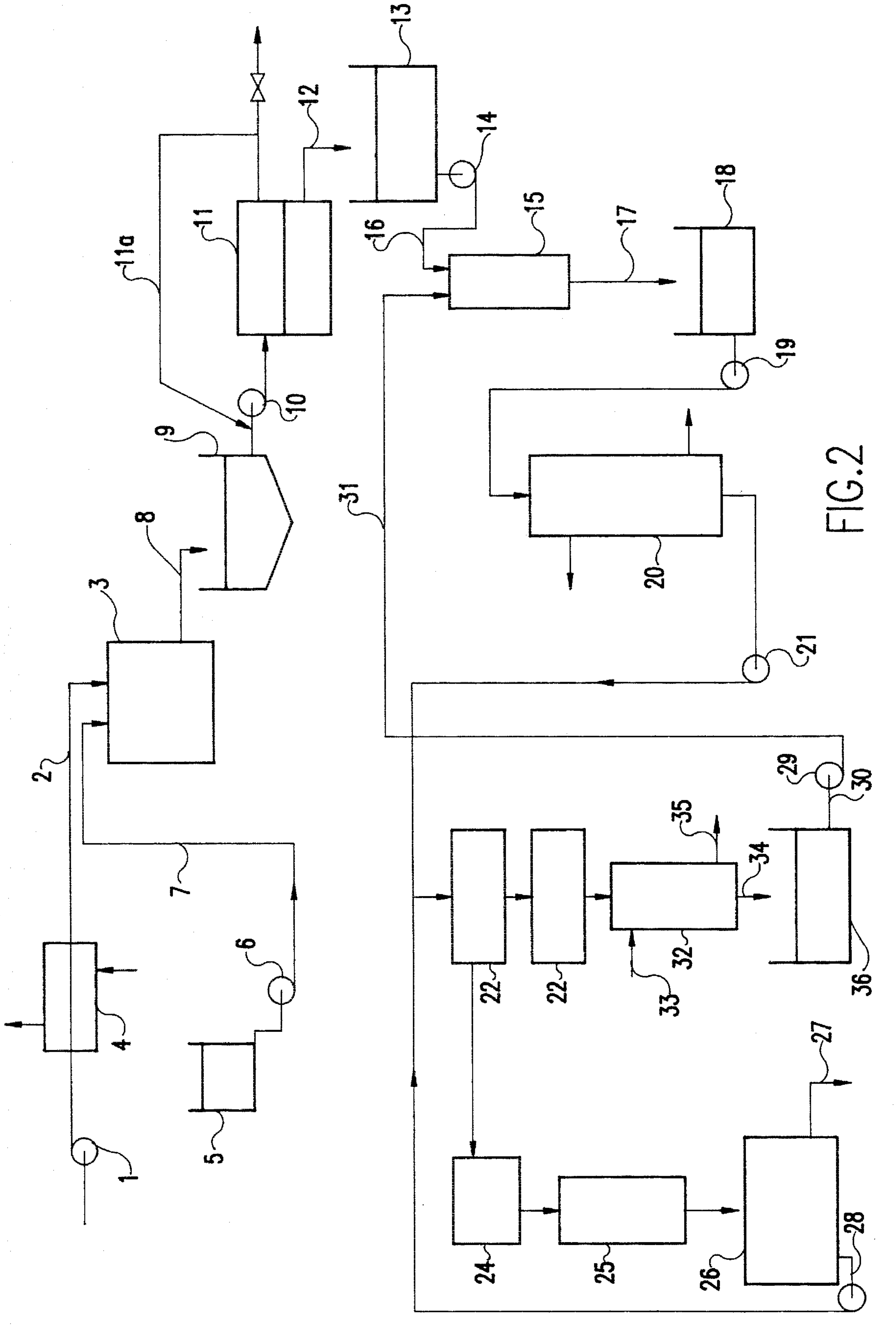

Other aspects and advantages of the present invention will be apparent from the following description of two preferred exemplified embodiments with reference to the accompanying drawing, FIGS. 1 and 2 of which are diagrammatic illustrations of installations for performing the process according to the invention.

In these examples, the initial aqueous sugar juice for treatment is a juice produced by grinding sugar cane, this juice containing sugars and organic and mineral impurities, including $Ca^{2+}$ and/or $Mg^{2+}$ ions.

DESCRIPTION OF FIG. 1

Although not absolutely essential, this juice can, in manner known per se, be preliminarily subjected to a clarification operation to eliminate the majority of the suspended solids. For this purpose it is fed by the circulation pump 1 and conduit 2 to the top of a flocculation tank 3 after having been heated preferably to 70°–105° C., e.g. by means of an indirect heat-exchanger 4. In tank 3 it is mixed, with vigorous agitation, with a flocculant stored in the tank 5 and fed from the latter to the top of the flocculation tank 3 by a circulating pump 6 and a conduit 7. Tank 5 may be provided with heating means (not shown), such as an inner jacket in which a hot fluid, e.g. hot water or steam, circulates; these heating means enable the flocculant to be heated to a temperature of about 70° to 80° C. The flocculant may, inter alia, be a slaked lime slurry, a cationic surfactant, particularly a quaternary ammonium compound of tallow fatty acids, such as dioctadecyldimethylammonium chloride, such as NORANIUM® M2SH marketed by the French company CECA, by derivatives of deacetylated poly-N-acetyl glucosamine chitosan obtained from chitin, such as PROFLO® 340 of the Norwegian company PROTAN BIOPOLYMER, or by a mixture of these. The quantity of flocculant will usually be 0.2 to 2 g/kg of dry substance of the juice for treatment. The flocculation mixture is then removed from the bottom of the tank 3 and fed via conduit 8 to a decantation tank 9, the base of which is substantially conical. Although not shown in FIG. 1, the base of tank 9 can be provided with a conduit and an extraction pump feeding the solid deposit collected in the conical part of the tank 9 to a filtration unit (e.g. a rotary filter), the filtrate then being collected in tank 9. After a contact time of the order of 30 to 60 minutes between the sugar juice and the flocculant, the supernatant liquid (clarified juice having a turbidity of about 15 to 60 NTU/Brix) in the tank 9 is removed from the latter by a circulation pump 10 delivering to a tangential microfiltration, ultrafiltration or nanofiltration unit 11. If required, the supernatant liquid thus removed from tank 9 can be reheated so that the operation in unit 11 takes place at a temperature of about 70° to 99° C. and preferably 95° to 99° C. The membrane used in the unit 11 may be of the organic or mineral type (e.g. $TiO_2$ or $ZrO_2$) and have a cut-off threshold corresponding to a molecular weight of at least 1000, good results being obtained with an ultrafiltration membrane having a cut-off threshold corresponding to a molecular weight of 300,000, and with a microfiltration membrane having a pore diameter of 0.1 μm. Thus the membrane KERASEP® may be used, which is available from the French company TECH-SEP, or the membrane FIMTEC® GR 90 PP of the American company DOW. The tangential speed of circulation of the clarified juice is adapted to the geometry of the microfiltration, ultrafiltration or nanofiltration unit used and may be about 2 to 9 m/s, preferably 6 m/s. This speed of flow is controlled by the pump 10, some of the filtered juice being recycled to the intake of the pump 10 via a return conduit 11*a*.

The permeate from unit 11, which has a turbidity of about 0.1 to 0.2 NTU/Brix, is then fed via a conduit 12 to a storage tank 13 from which it is withdrawn via a pump 14 to be fed to the top of a softening column 15 filled with a cation exchange resin, inter alia a strong cationic resin, in Na+ and/or K+ form, e.g. the resins C26® made by Rohm and Haas. The top of this column is provided with a permeate intake 16 connected to the delivery of the pump 14 and its bottom is provided with a softened permeate outlet conduit 17 ($Ca^{2+}$ and/or $Mg^{2+}$ ion content about 150 to 700 ppm), the $Ca^{2+}$ and/or $Mg^{2+}$ ions present in the permeate fed to the top of the column ($Ca^{2+}$ and/or $Mg^{2+}$ ion content of about 7000 ppm) being retained by the resin during the progression of the permeate through the column, the $Na^+$ and/or $K^+$ ions of this resin being displaced.

The softened liquid removed via conduit 17 then reaches a tank 18 from which it is withdrawn by a pump 19 to be fed to a concentration unit 20 which may, for example, be an evaporator such as a falling-float evaporator. The syrup obtained at the outlet of unit 20 is then fed via pump 21 to a crystallization unit 22 where it undergoes a number of successive crystallizations (three in the example shown in FIG. 1), delivering a raw sugar and a molasses in each crystallization stage. It should be noted here that the extraction yield of the sugars from the massecuite is of the order of 65% at the first crystallization stage, that the degree of coloration of the raw sugar obtained in this first stage is not more than 300 ICUMSA units, and that this same sugar has a 99.7% purity.

The molasses from the last crystallization stage is received in a storage tank 23.

The raw sugar produced in the first crystallization stage is subjected to a re-melt operation in tank 24, i.e. it is dissolved in hot water preferably at 80° C. The resulting syrup is then fed to a decolorization column 25 provided with an adsorbent such as animal black, activated carbon or a decolorization resin, e.g. a strong anionic resin in the form of a chloride, such as the resin IRA® 900 made by Rohm and Haas. The decolorization is preferably carried out hot, e.g. at 80° C., in column 25. In a variant, the decolorization of the syrup can be effected by tangential ultrafiltration or nanofiltration of the syrup.

The syrup thus decolorized is then treated in a crystallization unit 26 to deliver crystal white sugar at 27 and a crystallization syrup 28. The latter is preferably recycled by mixing it with the syrup from the concentration unit 20; it can also be used for the above-mentioned re-melt operation.

Also, the raw sugar obtained in the second and third crystallization stages of the crystallization unit 22 can, if required, be re-melted and then returned to the top of the crystallization unit 22.

The installation thus described may be completed by a circuit comprising a pump 29, the intake of which communicates via a conduit 30 with the base of the storage tank 23 and the delivery of which communicates via a conduit 31 with the top of the softening column 15. This circuit will be used when it is required to regenerate the resin filling the column 15, the molasses stored in the tank 23 acting as regeneration liquid because of its high $Na^+$ and/or $K^+$ ion content and its low $Ca^{2+}$ and/or $Mg^{2+}$ ion content. For this purpose all that is required is to stop the pump 14, start pump 29 and divert the effluent from conduit 17 to a tank other than tank 18.

Description of FIG. 2

The installation shown in FIG. 2 is in every respect identical to the installation shown in FIG. 1, except that the third crystallization stage of the crystallization unit 22 is replaced by a chromatography column 32 operating at a temperature of about 80° C., where the molasses from the second crystallization stage of the unit 22 is processed. This column is of the type comprising a fixed support in the form of a strong cationic resin, in $Na^+$ and/or $K^+$ form, e.g. the resin DOWEX® C356 of DOW or resin LES® 999301 of Rohm and Haas, the elution liquid being water fed to the top of the column via a conduit 33. The bottom part of the same column 32 is provided with conduit 34 for removal of a first sugar-depleted liquid effluent enriched in Na and/or K salts first eluted, and a conduit 35 for the removal of a second sugar-enriched liquid effluent, depleted in Na and/or K salts and secondly eluted. The said first effluent from conduit 34 is received in a storage tank 36. Because of its high $Na^+$ and/or $K^+$ ion content, the said first effluent may advantageously be used as a regeneration liquid for the softening column 15 in the same way as in the case of the installation shown in FIG. 1.

It should be noted that instead of the sugar cane juice treated in the installations according to FIGS. 1 and 2 it is, of course, possible to use a juice of different type. This may more particularly be a sugar-beet juice. In the latter case, however, the successive re-melt, decolorization and crystallization operations become pointless, since the sugar produced in the first crystallization stage of the crystallization unit 22 is a crystal white sugar; consequently, all that part of the installation in which the successive re-melt (tank 24), decolorization (decolorization column 25) and crystallization (crystallization unit 26) operations are performed can be dispensed with when the sugar juice treated is a sugar-beet type juice.

We claim:

1. A process for the manufacture of crystallized sugar from an aqueous sugar juice containing sugars, and organic impurities including colloids, and mineral impurities comprising a first step of processing said aqueous sugar juice using a filtration method selected from a group consisting of tangential microfiltration, tangential ultrafiltration, or tangential nanofiltration, thereby providing a filtrate, a second step of softening said filtrate to selectively remove calcium and magnesium ions, a third step of concentrating said filtrate to provide a syrup and a fourth step of crystallizing said syrup to provide a crystal sugar and molasses, said first step removing a substantial part of said colloids to prevent said colloids from impairing said second, third or fourth steps.

2. A process according to claim 1 wherein the softening operation is effected by bringing the sugar juice into contact with a cation exchange resin.

3. A process according to claim 2 wherein the crystallization step is followed by an operation for chromatography of said molasses to give a first sugar-depleted liquid effluent and a second-sugar enriched liquid effluent.

4. The process for the manufacture of crystallized sugar from an aqueous sugar juice as recited in claim 3 further comprising a fifth step of passing said first sugar-depleted liquid effluent through the ion exchange resin used in the softening step to regenerate said ion exchange resin.

5. The process for the manufacture of crystallized sugar from an aqueous sugar juice as recited in claim 2 further comprising a fifth step of passing said molasses through said cation exchange resin used in the softening step to regenerate said cation exchange resin.

6. A process according to claim 1 characterized in that it also comprises a prior clarification step on the initial aqueous sugar juice to give a clarified juice, said first step then being applied to this clarified juice.

7. A process according to claim 6, characterized in that said clarification step comprises a flocculation step followed by a decantation step.

8. A process for the manufacture of white crystal sugar from an aqueous sugar juice of the sugar cane juice type, containing sugars and organic and mineral impurities, including $Ca^{2+}$ and/or $Mg^{2+}$ ions, characterized in that it comprises the process according to any one of claims 1, 2 or 3 resulting in the production of a raw sugar, followed by the following operations:

re-melt of the raw sugar to give a melt sugar, decolorization of the melt sugar to give a decolorized melt sugar and crystallization of the decolorized melt sugar to give crystal white sugar.

* * * * *